United States Patent [19]
Campbell

[11] Patent Number: 5,831,225
[45] Date of Patent: Nov. 3, 1998

[54] SYSTEM AND METHOD FOR FASTENING INSULATING LAYERS TO A SUPPORT STRUCTURE

[75] Inventor: Michael T. Campbell, Grand Rapids, Mich.

[73] Assignee: Cascade Engineering, Inc., Grand Rapids, Mich.

[21] Appl. No.: 899,981

[22] Filed: Jul. 24, 1997

Related U.S. Application Data

[60] Provisional application No. 60/021,011 Jul. 26, 1996.
[51] Int. Cl.⁶ .................................................. E04B 1/82
[52] U.S. Cl. ........................ 181/284; 181/290; 296/33; 411/182; 428/99; 24/324; 52/404.2
[58] Field of Search ..................................... 181/284, 285, 181/287, 290, 210; 296/39.3; 52/716.6, 716.7, 404.2; 411/182; 24/297, 324; 428/99

[56] References Cited

U.S. PATENT DOCUMENTS

| | | | |
|---|---|---|---|
| 3,238,835 | 3/1966 | Rosenberg | 52/404.2 |
| 3,494,244 | 2/1970 | Wayland . | |
| 3,829,150 | 8/1974 | Moore | 296/39.3 |
| 4,164,986 | 8/1979 | Eloy et al. . | |
| 4,214,788 | 7/1980 | Srock . | |
| 4,568,215 | 2/1986 | Nelson . | |
| 4,800,984 | 1/1989 | Kerman . | |
| 4,861,208 | 8/1989 | Boundy . | |
| 4,938,645 | 7/1990 | Wollar . | |
| 5,056,199 | 10/1991 | Stein et al. . | |
| 5,228,816 | 7/1993 | Boville . | |
| 5,291,639 | 3/1994 | Baum et al. | 411/182 |
| 5,333,897 | 8/1994 | Landis et al. . | |
| 5,366,332 | 11/1994 | Murphy . | |
| 5,507,610 | 4/1996 | Benedetti et al. . | |
| 5,526,549 | 6/1996 | Mori et al. . | |

FOREIGN PATENT DOCUMENTS 59-164238  9/1984  Japan .

*Primary Examiner*—Khanh Dang
*Attorney, Agent, or Firm*—Rader, Fishman, Grauer & McGarry

[57] ABSTRACT

A barrier wall (20) separating a passenger compartment from an engine compartment of a motor vehicle has an acoustical barrier assembly (10) mounted thereto. The acoustical barrier assembly (10) includes a sound barrier layer (12) of a molded construction and sound dampening characteristics. At least one fastener (28) is integrally molded as a single piece with the sound barrier layer (12). The fastener (28) includes a plurality of outer spacer ribs (30) that project laterally from a tube (32) and space an inner surface (24) of the sound barrier layer (12) away from the barrier wall (20). A circumferentially extending flange head (34) is integral with the tube (32) and includes a first frusto-conical section (36) and a second inverse frusto-conical section (38). The annular bases of the first and second sections (36, 38) are integrally formed together while a lower end of the second section (38) is integrally formed with the tube (32), such that insertion of the flange head (34) through a barrier wall aperture (46) requires less force than removal of the flange head therefrom.

20 Claims, 2 Drawing Sheets

SYSTEM AND METHOD FOR FASTENING INSULATING LAYERS TO A SUPPORT STRUCTURE

CROSS-REFERENCE TO RELATED APPLICATION

This application claims the benefit of U.S. Provisional Application No. 60/021,011 filed on Jul. 26, 1996.

BACKGROUND OF THE INVENTION

1. Field of the Invention

This invention relates to an acoustical barrier with integrally molded retainers for fastening the barrier to a support structure, and more particularly to an acoustical barrier with integrally molded retainers for mounting the barrier to a fire wall of the vehicle and for fastening an absorber layer to the acoustical barrier.

2. Description of the Related Art

In most contemporary automobiles, a steel fire wall separates the engine compartment from the passenger compartment. To reduce the transmission of sound from the engine compartment through the fire wall and into the passenger compartment, a sound barrier mat (otherwise known as a dash mat) is typically constructed of an elastomeric material and is mounted to and substantially overlies the fire wall.

An absorber layer, typically constructed of an open cell foam material, is attached to the sound barrier mat and interfaces between the sound barrier mat and the firewall. An outer surface of the sound barrier mat is typically in contact with a bottom surface of the vehicle carpet and extends beyond the carpet to an upper portion of the fire wall behind the instrument panel. It is common to attach the absorber material to the sound barrier mat through the application of hot melt glue or spray adhesive. Adhesives that are capable of bonding the foam material to the elastomeric mat are dissolved in solvents which are typically ozone depleting and therefore must be handled with extreme care. Many of these types of adhesives are no longer being manufactured due to environmental concerns and new industrial standards. A technique known as heat staking has been used as an alternative to ozone-depleting adhesives. However, the layers must be properly aligned and temporarily fastened together before heat staking. It would be advantageous to attach the absorber layer to the sound insulating layer without the difficulties encountered with adhesives or temporary fasteners.

Multiple studs are typically attached to the fire wall through welding or mechanical fastening. To install the sound insulating and absorber layers in a vehicle, apertures that correspond with the stud placement are formed in the sound insulating and absorber layers. Each aperture is aligned with a corresponding stud and pushed onto the stud until the absorber layer contacts the fire wall. Subsequently, an end connector is positioned on the stud to prevent separation of the layers from the fire wall. Installation of the layers to the studs in this manner requires a number of different parts and some time-consuming effort. The different parts and effort result in increased inventory, expense, and installation time.

SUMMARY OF THE INVENTION

These and other problems of the prior art are overcome by a system for mechanically fastening a sound insulating layer and absorber layer to a support structure wherein the sound insulating layer has an integrally formed fastener for insertion through the absorber layer and an aperture in the support structure.

According to the invention, an acoustical barrier is adapted for mounting to a barrier wall. The acoustical barrier includes a sound barrier layer of a molded construction and sound dampening characteristics with an inner surface that is adapted to face the barrier wall and an outer surface that is adapted to face away from the barrier wall. A fastener is integrally molded as a single piece with the sound barrier layer. The fastener includes a first substantially continuous wall having a circumference with a cross dimension that is sized to fit within an aperture in the barrier wall. A first end of the first wall is integrally formed with the inner surface of the mass layer and a hollow flange head integrally formed with a second end of the first wall opposite the first end. The hollow flange head has a second circumferentially extending wall that tapers toward a free end of the flange head, a cross dimension of which is greater than the cross dimension of the barrier wall aperture so that the fastener is retained in the barrier wall by the second circumferentially extending wall. The second circumferentially extending wall is collapsible to fit within the barrier wall aperture and expandable when clear of the aperture. In this manner, the acoustical barrier is secured to the barrier wall when the flange head is inserted completely through the barrier wall and the first circumferentially extending wall is received within the aperture.

Although the first wall can be solid with only an exterior surface, it is preferred that the wall define a hollow interior with an interior surface and one or more reinforcing ribs being integrally formed with the interior surface.

In addition to the internal reinforcing ribs, or as an alternative, one or more spacer ribs can be integrally formed with the outer surface of the first wall and the inner surface of the sound barrier layer to reinforce the first wall. A top edge of the spacer rib is adapted to abut the sound barrier wall when the acoustical barrier is mounted thereon for spacing the inner surface of the sound barrier layer from the barrier wall and for reinforcing the first wall.

Further according to the invention, the second circumferentially extending wall of the fastener includes an inverse frusto-conical section with an apex end integrally formed with the second end of the first wall and a base, and a frusto-conical section with a base integrally formed with the base of the inverse frusto-conical section and an apex end facing away from the inner surface of the sound barrier layer. Preferably, the height of the inverse frusto-conical section is less than the height of the frusto-conical section, such that insertion of the flange head through the barrier wall aperture requires less force than removal of the flange head therefrom.

According to a further embodiment of the invention, a motor vehicle acoustical barrier assembly having a barrier wall separating a passenger compartment from an engine compartment has an acoustical barrier with one or more integral fasteners mounted to the barrier wall. The barrier wall includes one or more aperture extending therethrough for receiving the fasteners of the acoustical barrier. The acoustical barrier comprises a sound barrier layer of a molded construction and sound dampening characteristics. An inner surface of the sound barrier layer faces the barrier wall and an outer surface thereof faces away from the barrier wall. The one or more fasteners are integrally molded as a single piece with the sound barrier layer. The fastener includes a first substantially continuous wall having a circumference with a cross dimension that is sized to fit within the barrier wall aperture. A first end of the wall is integrally formed with the inner surface of the mass layer. A hollow flange head is integrally formed with a second end of the wall opposite the first end. The hollow flange head has a second circumferentially extending wall that tapers toward a free end of the flange head. The second circumferentially extending wall has a cross dimension that is greater than the cross dimension of the barrier wall aperture so that the fastener is retained in the barrier wall by the second circumferentially extending wall. The second circumferentially extending wall is collapsible to fit within the barrier wall aperture and expandable when clear of the barrier wall aperture. With this arrangement, the acoustical barrier is secured to the barrier wall by inserting the flange head completely through the barrier wall until the first circumferentially extending wall is located within the aperture.

BRIEF DESCRIPTION OF THE DRAWINGS

The invention will now be described with reference to the drawings in which.

DETAILED DESCRIPTION OF THE PREFERRED EMBODIMENTS

Figure 1:
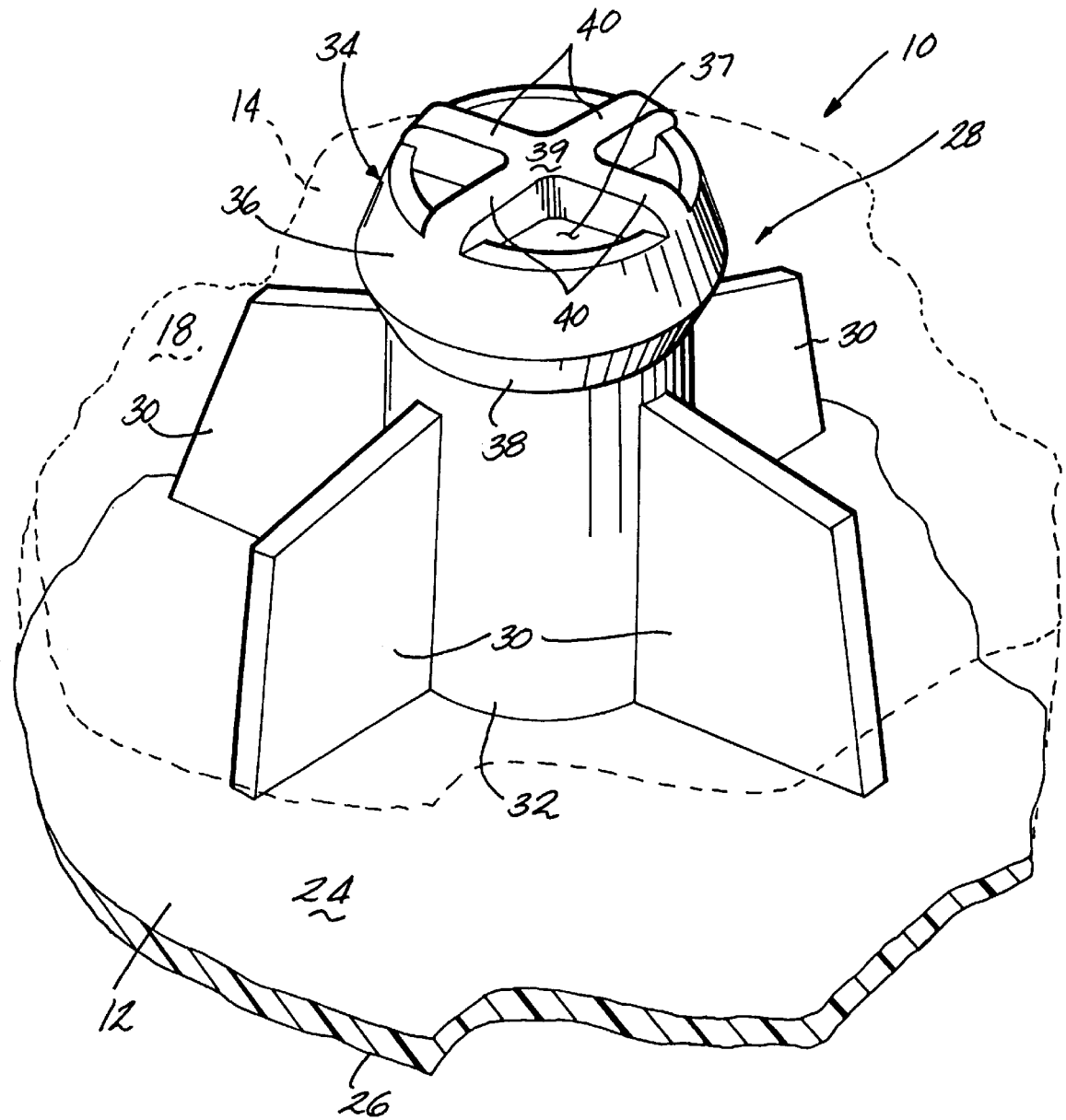
FIG. 1 is perspective view of an integral fastener assembly illustrating a portion of a sound barrier mat and absorber layer (dashed line) attached together through an integral fastener according to the invention.
Figure 2:
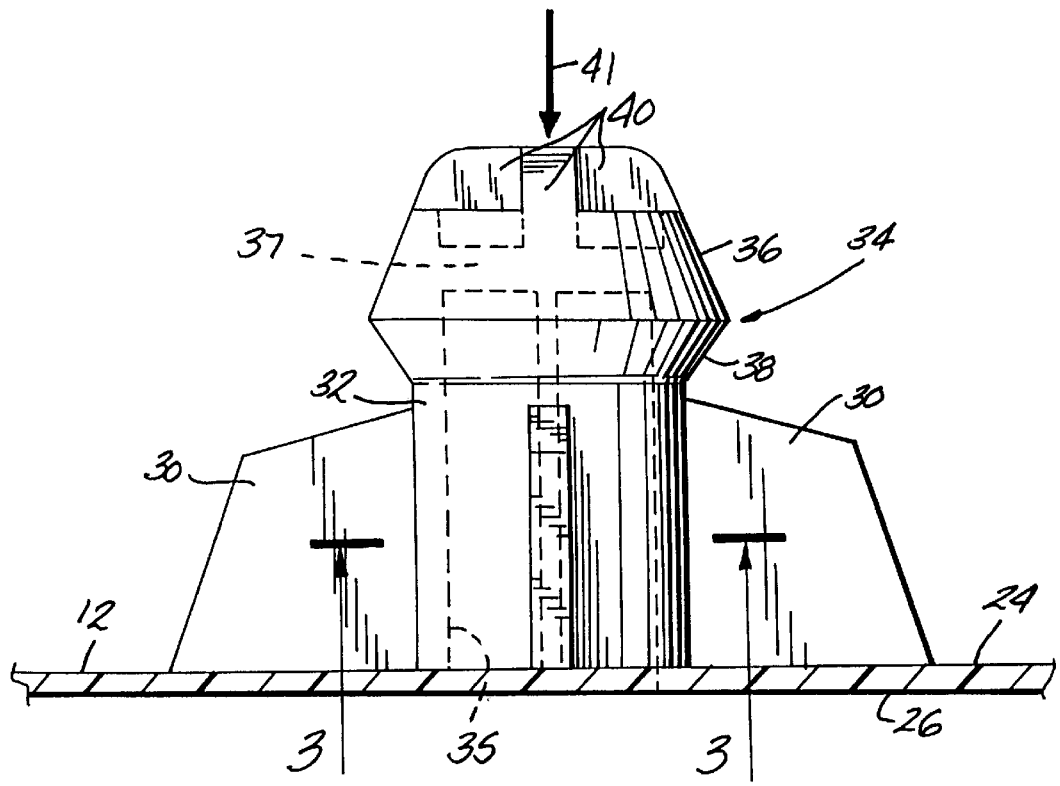
FIG. 2 is a side elevational view of a portion of the sound barrier mat and the integral fastener of FIG. 1.
Figure 5:
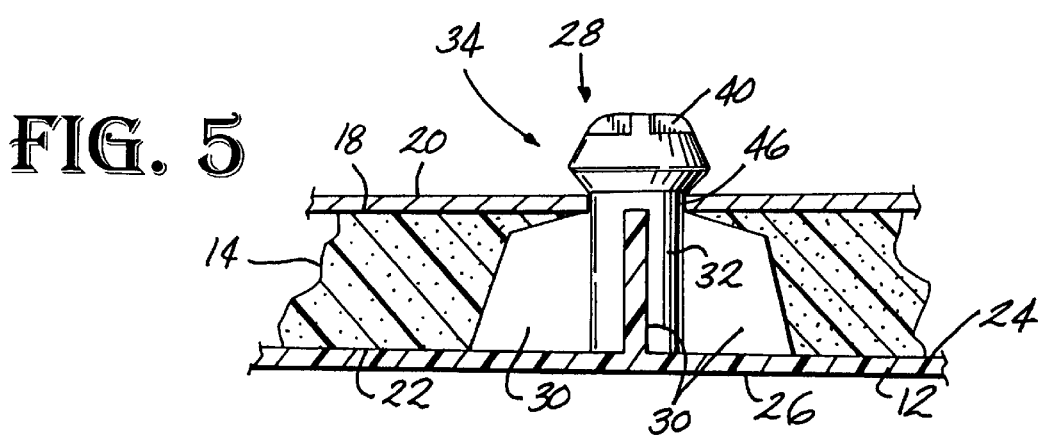
FIG. 5 is a partial cross-sectional view of the integral fastener assembly of FIG. 1 in the installed position.

Referring now to FIGS. 1, 2 and 5, an acoustical barrier or dash mat assembly 10 includes an outer sound barrier mat or layer 12 and an inner absorber mat or layer 14 (shown in dashed line in FIG. 1). The outer sound barrier mat 12 is preferably formed of a filled elastomeric moldable polymer, e.g., elastomeric polypropylene, and is attached to the firewall of a vehicle from the passenger compartment side. The mat 12 serves as a sound barrier layer to reduce the transmission of sound from the engine compartment through the fire wall and into the passenger compartment of a vehicle. The inner absorber mat 14 is formed of a flexible foam material, such as polyurethane, or fiberglass batting. An inner surface 18 of the mat 14 is typically positioned against a vehicle fire wall 20 (FIG. 5), while an outer surface 22 thereof faces an inner surface 24 of the sound barrier mat 12. An outer surface 26 of the sound barrier mat 12 faces the underside of a vehicle carpet (not shown) and typically extends past the carpet behind the instrument panel.

Figure 4:
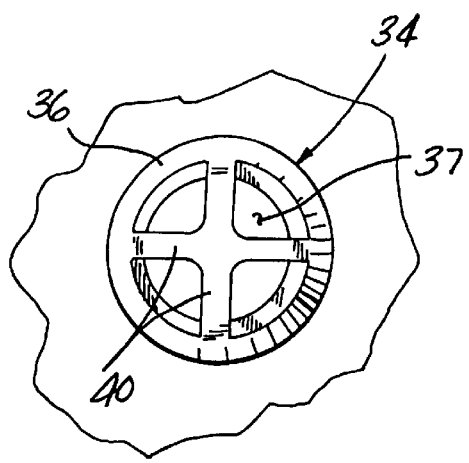
FIG. 4 is a top plan view of an integral fastener assembly according to a second embodiment of the invention.

A mechanical fastener 28 is integral with and extends upwardly from the inner surface 24 of the dash mat 12. Although only one fastener is shown in conjunction with the dash mat, it is to be understood that a plurality of fasteners can be provided at different locations thereon to secure the dash mat to the vehicle. The fastener 28 includes a plurality of outer spacer ribs 30 that project laterally from a tube 32. The ribs 30 compress the absorber mat 14 in the vicinity of the fastener to hold the absorber mat 14 in position with respect to the dash mat 12 when installed thereon. The ribs 30 also function as spacers to maintain the dash mat 12 a sufficient distance from the fire wall 20 such that the absorber mat 14 can be located therebetween. One end of the tube 32 is integrally molded with the dash mat 12 and projects from the inner surface 24. The height of the tube 32 and/or the ribs 30 can be varied depending on the thickness of the absorber mat and the particular spacing required between the dash mat 12 and the fire wall. Alternatively, the ribs 30 can be eliminated, as shown in FIG. 4, when the dash mat is placed directly against the firewall, e.g., at a location where an absorber mat is not to be installed. A hollow, circumferentially extending flange head 34 is integral with and protrudes laterally from the tube 32. The flange head 34 comprises a first frusto-conical section 36 and a second inverse frusto-conical section 38. The first and second frusto-conical sections are preferably continuous around their periphery. The annular bases of the first and second sections 36, 38 are integrally formed together while a lower end of the second section 38 is integrally formed with an opposite end of the tube 32. The axial height of the first portion 36 is greater than the axial height of the second portion 38, as shown most clearly in FIG. 2. A central bore 35 extends through the dash mat 12 between the outer surface 26 and the inner surface 24, the tube 32 and a portion of the flange head 34. An upper end of the bore 35 terminates at an internal solid wall 37. The wall 37 is preferably substantially parallel to the inner surface 24 of the dash mat 12 and covers the bore upper end. The wall 37 provides stiffness to the upper portion of the flange head 34 to resist outward deflection while permitting inward deflection of the flange head 28. The wall 37 also serves as an acoustical barrier to sound that would otherwise travel through the interior of the fastener 28 from the engine compartment to the passenger compartment when installed on the vehicle fire wall. A plurality of support ribs 40 are integral with and extend radially outwardly from a central portion 39 of the flange head 34 and terminate at the first section 36.

Preferably, the dash mat and fastener are formed during a single molding operation. After the dash mat and fastener are formed and before their release from the mold, an ejection pin (not shown) travels in a direction as denoted by arrow 41 in FIG. 3, and pushes against the central portion 39 to eject the dash mat and fastener from the mold. The support ribs 40 function to distribute forces generated during molding and installation around the upper portion of the flange head. The flange head 34 also collapses to enable its removal from the mold when the ejection pin presses against the central portion 39.

Figure 3:
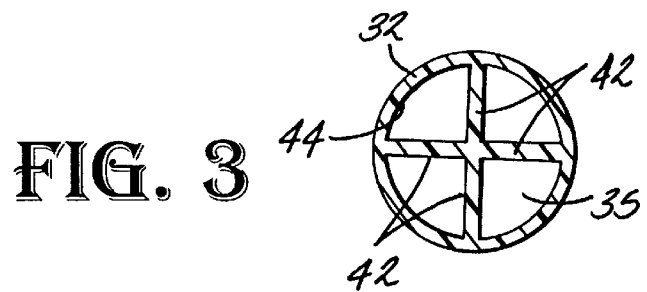
FIG. 3 is a cross-sectional view of the integral fastener taken along line 3—3 of FIG. 2.

As shown in FIG. 3, a plurality of internal support ribs 42 extend radially outwardly from a central axis of the tube 32 and terminate at an inner circumferential surface 44 of the tube to strengthen the tube against buckling. In some instances, the inner support ribs 42 can be eliminated and the strengthening function accomplished by the outer spacer ribs 30.

With particular reference now to FIG. 5, the fastener 28 replaces the conventional studs in the vehicle fire wall and their associated push nuts for attaching the dash mat to the vehicle. An opening 46 extends through the fire wall for each fastener and has an inside diameter substantially equal to an outside diameter of the tube 32. The dash mat assembly 10 is installed by positioning the absorber mat 14 over the sound barrier mat. The absorber mat 14 can have a plurality of holes preformed therein at positions corresponding to the position of the fasteners 28 on the dash mat 14. If holes are not provided in the absorber mat, the mat is preferably formed from a material that is readily adaptable to forming holes when pushed over the fasteners. In any event, the absorber mat is pushed toward the dash mat until the head of each fastener 28 clears the inner surface 18 of the absorber mat and the outer surface 22 thereof abuts the inner surface 24 of the dash mat 12. Installation of the absorber layer to the dash mat can occur at the vehicle assembly sight or at a location remote therefrom, such as at the dash mat forming facility. The dash mat assembly 10 is then positioned adjacent to the fire wall 20 of a vehicle and adjusted until the fasteners 28 are aligned with their respective holes 46 in the fire wall. Each fastener is then pushed toward its respective hole 46. The flange head 34 of each fastener collapses inward as the first frusto-conical portion 36 of the flange head engages the hole 46, and continues to collapse until the first conical base clears the hole. The flange head then expands outwardly to its original shape to thereby lock the dash mat assembly 10 to the fire wall 20. Since the axial height of the first portion 36 is greater than the axial height of the second portion 38, a greater force must be exerted during fastener removal than during insertion.

A unique advantage of the above-described embodiments over conventional securing techniques is that the foam material can slide over the stiffer elastomeric material when flexed, thereby eliminating shearing of the foam material and thus separation of the foam material from the elastomeric material at the shear interface that would otherwise occur with the prior art. Thus, a simple, effective and cost reducing means is provided for attaching an absorber layer to a sound barrier layer, either temporarily or permanently.

The invention finds particular use in automobile dash mats in which an injection molded elastomeric barrier layer is attached to a synthetic elastomeric foam layer.

The invention also finds use in other single or composite layers in automotive or non-automotive applications wherein one of the layers functions as a cover that can be attached temporarily or permanently to a support surface. Since the fastener of the present invention projects from only one side of a layer of material, the other side can be used for decorative covering in various environments. For example, the fasteners of the invention can be used to attach decorative panels to the doors of a vehicle, or any other suitable structure.

Reasonable variation and modification are possible within the spirit of the foregoing specification and drawings without departing from the scope of the invention.

The embodiments for which an exclusive property or privilege is claimed are defined as follows:

1. An acoustical barrier adapted to be mounted to a barrier wall having an aperture with a cross dimension, the acoustical barrier comprising:
   a sound barrier layer of a molded construction and sound dampening characteristics, the sound barrier layer having an inner surface that is adapted to face the barrier wall and an outer surface adapted to face away from the barrier wall;
   a fastener integrally molded as a single piece with the sound barrier layer, the fastener including a first substantially continuous wall having a circumference with a cross dimension that is sized to fit within the barrier wall aperture, a first end of the first wall integrally formed with the inner surface of the mass layer, a hollow flange head integrally formed with a second end of the first wall opposite the first end, the hollow flange head having a second circumferentially extending wall that tapers toward a free end of the flange head, the second circumferentially extending wall having a cross dimension that is greater than the cross dimension of the barrier wall aperture so that the fastener is retained in the barrier wall by the second circumferentially extending wall, the second circumferentially extending wall being collapsible to pass through the barrier wall aperture and expandable when clear of the barrier wall aperture;
   wherein the acoustical barrier is secured to the barrier wall when the flange head is inserted completely through the barrier wall and the first circumferentially extending wall is received within the aperture.

2. An acoustical barrier according to claim 1 wherein the first wall defines a hollow interior with an interior surface, and further comprising at least one reinforcing rib integrally formed with the interior surface.

3. An acoustical barrier according to claim 2 wherein the at least one reinforcing rib comprises a plurality of reinforcing ribs, each reinforcing rib having a first end joined at a center of the hollow interior with the first end of the other reinforcing ribs and a second end integrally formed with the interior surface.

4. An acoustical barrier according to claim 1 and further comprising at least one spacer rib having a bottom edge, a top edge, and a pair of side edges extending between the bottom and top edges, one of the side edges being integrally formed with an outer surface of the first wall and the bottom edge being integrally formed with the inner surface of the sound barrier layer, the top edge of the spacer rib adapted to abut the barrier wall when the acoustical barrier is mounted thereon for spacing the inner surface of the sound barrier layer from the barrier wall.

5. An acoustical barrier according to claim 4 wherein the length of the spacer rib from the bottom edge to the top edge thereof is less than the length of the first wall from the inner surface of the sound barrier layer to the flange head such that the barrier wall is sandwiched between the flange head and the spacer rib when the acoustical barrier is mounted to the barrier wall.

6. An acoustical barrier according to claim 5 wherein the at least one spacer rib comprises a plurality of spacer ribs equally spaced around the circumference of the first wall.

7. An acoustical barrier according to claim 6 and further comprising an absorber layer with an outer surface in contact with the sound barrier layer and an inner surface adapted to contact the barrier wall.

8. An acoustical barrier according to claim 7 wherein the second circumferentially extending wall includes an inverse frusto-conical section with an apex end integrally formed with the second end of the first wall and a base, and a frusto-conical section with a base integrally formed with the base of the inverse frusto-conical section and an apex end facing away from the inner surface of the sound barrier layer.

9. An acoustical barrier according to claim 8 wherein the height of the inverse frusto-conical section is less than the height of the frusto-conical section, such that insertion of the flange head through the barrier wall aperture requires less force than removal of the flange head therefrom.

10. An acoustical barrier according to claim 1 wherein the second circumferentially extending wall includes an inverse frusto-conical section with an apex end integrally formed with the second end of the first wall and a base, and a frusto-conical section with a base integrally formed with the base of the inverse frusto-conical section and an apex facing away from the inner surface of the sound barrier layer.

11. An acoustical barrier according to claim 10 wherein the height of the inverse frusto-conical section is less than the height of the frusto-conical section, such that insertion of the flange head through the barrier wall aperture requires less force than removal of the flange head therefrom.

12. An acoustical barrier according to claim 1 and further comprising at least one spacer rib having a bottom edge, a top edge, and a pair of side edges extending between the bottom and top edges, one of the side edges being integrally formed with an outer surface of the first wall and the bottom edge being integrally formed with the inner surface of the sound barrier layer, the top edge of the spacer rib adapted to abut the barrier wall when the acoustical barrier is mounted thereon for spacing the inner surface of the sound barrier layer from the barrier wall.

13. An acoustical barrier according to claim 12 wherein the length of the spacer rib from the bottom edge to the top edge thereof is less than the length of the first wall from the inner surface of the sound barrier layer to the flange head such that the barrier wall is sandwiched between the flange head and the spacer rib when the acoustical barrier is mounted to the barrier wall.

14. An acoustical barrier according to claim 13 wherein the at least one spacer rib comprises a plurality of spacer ribs equally spaced around the circumference of the first wall.

15. An acoustical barrier according to claim 14 and further comprising an absorber layer with an outer surface in contact with the sound barrier layer and an inner surface adapted to contact the barrier wall.

16. In a motor vehicle acoustical barrier assembly having a barrier wall separating a passenger compartment from an engine compartment and an acoustical barrier mounted to the barrier wall, the barrier wall having at least one aperture extending therethrough, the acoustical barrier comprising:

a sound barrier layer of a molded construction and sound dampening characteristics, the sound barrier layer having an inner surface that faces the barrier wall and an outer surface that faces away from the barrier wall;

at least one fastener integrally molded as a single piece with the sound barrier layer, the fastener including a first substantially continuous wall having a circumference with a cross dimension that is sized to fit within the barrier wall aperture, a first end of the wall integrally formed with the inner surface of the mass layer, a hollow flange head integrally formed with a second end of the wall opposite the first end, the hollow flange head having a second circumferentially extending wall that tapers toward a free end of the flange head, the second circumferentially extending wall having a cross dimension that is greater than the cross dimension of the barrier wall aperture so that the fastener is retained in the barrier wall by the second circumferentially extending wall, the second circumferentially extending wall being collapsible to pass through the barrier wall aperture and expandable when clear of the barrier wall aperture;

wherein the acoustical barrier is secured to the barrier wall by inserting the flange head completely through the barrier wall until the first circumferentially extending wall is located within the aperture.

17. An acoustical barrier assembly according to claim 16 and further comprising at least one spacer rib having a bottom edge, a top edge, and a pair of side edges extending between the bottom and top edges, one of the side edges being integrally formed with an outer surface of the first wall and the bottom edge being integrally formed with the inner surface of the sound barrier layer, the top edge of the spacer rib abutting the barrier wall with the inner surface of the sound barrier layer spaced from the barrier wall.

18. An acoustical barrier assembly according to claim 17 wherein the length of the spacer rib from the bottom edge to the top edge thereof is less than the length of the first wall from the inner surface of the sound barrier layer to the flange head such that the barrier wall is sandwiched between the flange head and the spacer rib.

19. An acoustical barrier assembly according to claim 18 and further comprising an absorber layer having an outer surface in contact with the sound barrier layer and an inner surface in contact with the barrier wall.

20. An acoustical barrier assembly according to claim 16 wherein the second circumferentially extending wall includes an inverse frusto-conical section with an apex end integrally formed with the second end of the first wall and a base, and a frusto-conical section with a base integrally formed with the base of the inverse frusto-conical section and an apex end facing away from the inner surface of the sound barrier layer.

\* \* \* \* \*